US006393636B1

(12) United States Patent
Wheeler

(10) Patent No.: US 6,393,636 B1
(45) Date of Patent: May 28, 2002

(54) PATIENT ROTATION SYSTEM

(76) Inventor: Basil W. Wheeler, 20326 Highway 127, Athens, AL (US) 35614

( * ) Notice: Subject to any disclaimer, the term of this patent is extended or adjusted under 35 U.S.C. 154(b) by 0 days.

(21) Appl. No.: 09/582,008

(22) PCT Filed: Dec. 23, 1997

(86) PCT No.: PCT/US97/24143

§ 371 (c)(1), (2), (4) Date: Jun. 20, 2000

(87) PCT Pub. No.: WO99/32064

PCT Pub. Date: Jul. 1, 1999

(51) Int. Cl.[7] .......... A61C 7/06
(52) U.S. Cl. .......... 5/81.1 R; 5/81.1 C
(58) Field of Search .......... 5/81 R, 81.1 HS, 5/88.1, 81.1 C; 198/468.1

(56) References Cited

U.S. PATENT DOCUMENTS

| | | | |
|---|---|---|---|
| 2,812,524 | A | 11/1957 | Pruitt |
| 3,886,605 | A | 6/1975 | Harris |
| 4,747,170 | A | 5/1988 | Knouse |
| 5,155,874 | A | 10/1992 | Kershaw |
| 5,161,267 | A | 11/1992 | Smith |
| 5,168,587 | A | 12/1992 | Shutes |
| 5,274,862 | A | 1/1994 | Palmer, Jr. et al. |
| 5,359,739 | A | 11/1994 | Rains et al. |
| 5,524,304 | A | 6/1996 | Shutes |
| 5,530,974 | A | 7/1996 | Rains et al. |
| 5,697,109 | A | 12/1997 | Hodgetts |

*Primary Examiner*—Lynne H. Browne
*Assistant Examiner*—Fredrick Conley
(74) *Attorney, Agent, or Firm*—Waddey & Patterson, P.C.; John C. Garvin, Jr.

(57) ABSTRACT

A patient rotation system for rotating bedfast patients (P) on a periodic basis from his back to either side, from either side to his back, or from one side to the other side. The system includes, in combination, two major elements, a patient rotation device (10) and a rotation sheet (90) which permits a smooth, continual and rapid rotation of the bedfast patient (P).

16 Claims, 6 Drawing Sheets

PATIENT ROTATION SYSTEM

TECHNICAL FLED

The present invention relates to a system for repositioning a bedfast patient, and more particularly to a portable system for rotating a bedfast patient to either side from his back (ninety degrees), or from one side to his back (ninety degrees), or from one side to another side (one hundred eighty degrees) by a single attendant.

BACKGROUND ART

It is well known in the health care field that there are common and recurring problems associated with the care of bedfast patients. Generally, most such problems are due to the patient's reduced body strength and limited mobility of their upper and lower extremities. One such problem stems from the requirement that bedridden patients must be rotated to either side from his back, or from one side to his back, every two hours in order to prevent the formation of bed sores. Due to the awkward weight of a bedridden patient coupled with the patient's inability to offer assistance, these repositioning tasks amount to strenuous lifting and sliding exercises and are quite difficult to perform. In fact, attendants frequently incur back injuries when attempting to reposition a bedfast patient. For fear of these injuries, attendants will occasionally neglect their repositioning duties or perform them on an irregular basis thereby subjecting the patient to undue comfort, and in so doing, possibly even enhance the formation of bed sores.

Bedsores and poor blood circulation are common ailments of invalid patients. For this reason, good medical practice requires that a patient be rotated or turned periodically to relieve pressure on particular joints and muscles, and to vary the circulation pattern and permit free circulation to all parts of the body. Since invalid patients can suffocate if rolled over onto their stomach for any period of time, the patient is merely rotated or turned partially so that the patient lies flat on his back, then on one side, then the other side in alternating sequence. The patient may be supported by a pillow against the side and under the back. This requires repeated physical labor by the persons caring for the patient. Because of the difficulty of doing this, and staff shortages, patients, many times, are not turned as often as good medical practice requires.

A procedure often used in hospital and nursing homes for the periodic rotation of patients is to place a folded sheet under the midsection of a patient and having two attendants or nursing aides, working together, to rotate the patient by pulling on one end of the folded sheet to thus turn the patient to either side from his back, or from one side to his back.

This procedure is time-consuming and requires substantial physical labor. The amount of labor generally requires that two or more persons carry out the steps described above. This often makes it impossible for a patient to be cared for at home even though the condition of the patient is otherwise acceptable for home care. This causes substantial additional health care costs, overcrowding and staff shortages.

It is also documented that one of the significant causes of workers compensation claims and on-the-job injuries in hospitals and nursing homes are strains, muscle pulls and the like resulting from the continuous practice of the procedures described above even with two attendants.

Devices which facilitate the repositioning or rotation of bedfast patients are disclosed in the following United States patents, namely: U.S. Pat. No. 4,747,170 to Knouse; U.S.

Pat. No. 5,155,874 to Kershaw; U.S. Pat. No. 5,161,267 to Smith; U.S. Pat. No. 5,168,587 to Shutes; U.S. Pat. No. 5,274,862 to Palmer, Jr. et al.; U.S. Pat. No. 5,359,739 to Rains et al.; U.S. Pat. No. 5,524,304 to Shutes; and U.S. Pat. No. 5,530,974 to Rains et al.

U.S. Pat. No. 4,747,170 to Knouse discloses an electrically driven device which can be positioned on either side of a bed for grasping one edge of a sheet to move a patient from the bed to a gurney positioned on the side of the bed. U.S. Pat. No. 5,155,874 to Kershaw discloses a turn sheet for turning a bedfast patient positioned on a bed between back and side positions and a mechanical lifting device for engaging a selected edge of the turn sheet for turning the patient. U.S. Pat. No. 5,161,267 to Smith discloses an apparatus for lifting and turning a bedfast patient within a bed which includes an open framework positioned above the bed, a plurality of straps, and an electrical motor for pulling on the straps to lift and turn the bedfast patient. U.S. Pat. No. 5,168,587 to Shutes discloses a patient positioning device including a corset adapted to be positioned around the torso of a patient, flexible straps coupled at one of their ends to the corset, and an electrical drive assembly located beneath the bed and connected to the other ends of the flexible straps for pulling on the straps to turn or reposition the patient. U.S. Pat. No. 5,274,862 to Palmer Jr. et al. discloses a device for turning or rotating a patient while lying on a bed and for moving the patient to a selected location on the bed. Each of U.S. Pat. No. 5,359,739 and U.S. Pat. No. 5,530,974 to Rains et al. discloses a fabric device for repositioning a patient in a bed, either by sliding the patient along the bed longitudinally or by rolling the patient, which device include a pair of cushioned cylinders for maintaining the patient in a stable position. U.S. Pat. No. 5,524,304 to Shutes discloses a patient positioning device including a corset adapted to be positioned around the torso of a patient lying in a bed, flexible straps coupled at one of their ends to the corset, and electrical drive means secured to bed rails on each side of the bed connected to the other ends of the straps for pulling on the straps to turn or reposition the patient.

These patents as well as others are generally relatively complex and possess numerous disadvantages and deficiencies which are overcome by the present invention. Many are expensive and space consuming and require substantial time of caregivers for setting up, therefore they are not practical. Some lift the patient which might cause injury to the patient. Thus, the age old tradition of rotating a bedfast patient every two hours by hand and usually by two attendants remains a serious problem.

DISCLOSURE OF THE INVENTION

A safe, efficient, labor and time saving system is provided by the present invention to rotate bedfast patients on a periodic basis from his back to either side (a ninety degree rotation), or from either side to his back (a ninety degree rotation), or from one side to the other side (a full one hundred eighty degree rotation). The system includes, in combination, two major elements, a patient rotation device and a rotation sheet which permits a smooth, continual and rapid rotation of the bedfast patient. There is little, if any, jerking, tugging, twisting, or lifting of the bedfast patient, thus providing the maximum amount of comfort possible.

The patient rotation device is a compact, light weight, unit that is readily movable by one person, and can be quickly and efficiently operated by one person when engaged with the rotation sheet to rotate a bedfast patient to and from one of three positions. After a bedfast patient is rotated, patient rotation device can be disconnected from the rotation sheet and repeatedly moved to other beds by a single person to rotate other persons. The rotation sheet always remains on the mattress under the patient. However, for comfort purposes, a folded sheet and/or a linen saver may be placed between the upper surface of the rotation sheet and the bedfast patient.

The patient rotation device comprises a frame, a roller rotatably journalled in the frame, means for securing a rotating sheet to the roller, means for driving or rotating the roller, and means for carrying the patient rotation device between patients. The rotation sheet is a piece of cloth material whose opposed edges extend over the side edges of the bed and incorporate means within the opposed edges for attachment to the roller of the patient rotation device. The rotation sheet has a slick lower side or surface and a coarse or rough upper side or surface.

It is an object of the present invention to facilitate the rotation of a bedfast patient to either side from his back, or from one side to his back, or from one side to the other side.

It is a further object of the present invention to provide a system which allows a single attendant to easily rotate a bedfast patient from one side to his back, or to either side from his back, or from one side to the other side.

It is a further object of the present invention to provide a system and method for rotating a bedfast patient to either side from his back, or from one side to his back, or from one side to the other side by a single attendant to minimize the potential of injury to either the bedfast patient or the attendant.

It is a further object of the present invention to provide a system for rotating a bedfast patient to positions wherein the patient is rotated to lie on one of his sides or his back by a single attendant to minimize the potential of injury to the attendant or the patient.

It is yet a further object of the present invention to provide a system which permits a smooth, continual and rapid rotation of a bedfast patient from and to several positions with little, if any, jerking, tugging, twisting, or lifting of the bedfast patient.

It is still a further object of the present invention to provide a portable apparatus and rotation sheet for rotating a bedfast patient from his back to either of his sides, or from either side to his back, or from either side to the other side by a single attendant and which does not rely upon the strength or size of the single attendant.

The foregoing objects are met by the present invention and will become more apparent from the following detailed description, considered in conjunction with the accompanying drawings.

BEST MODE(S) FOR CARRYING OUT THE INVENTION

Figure 6:
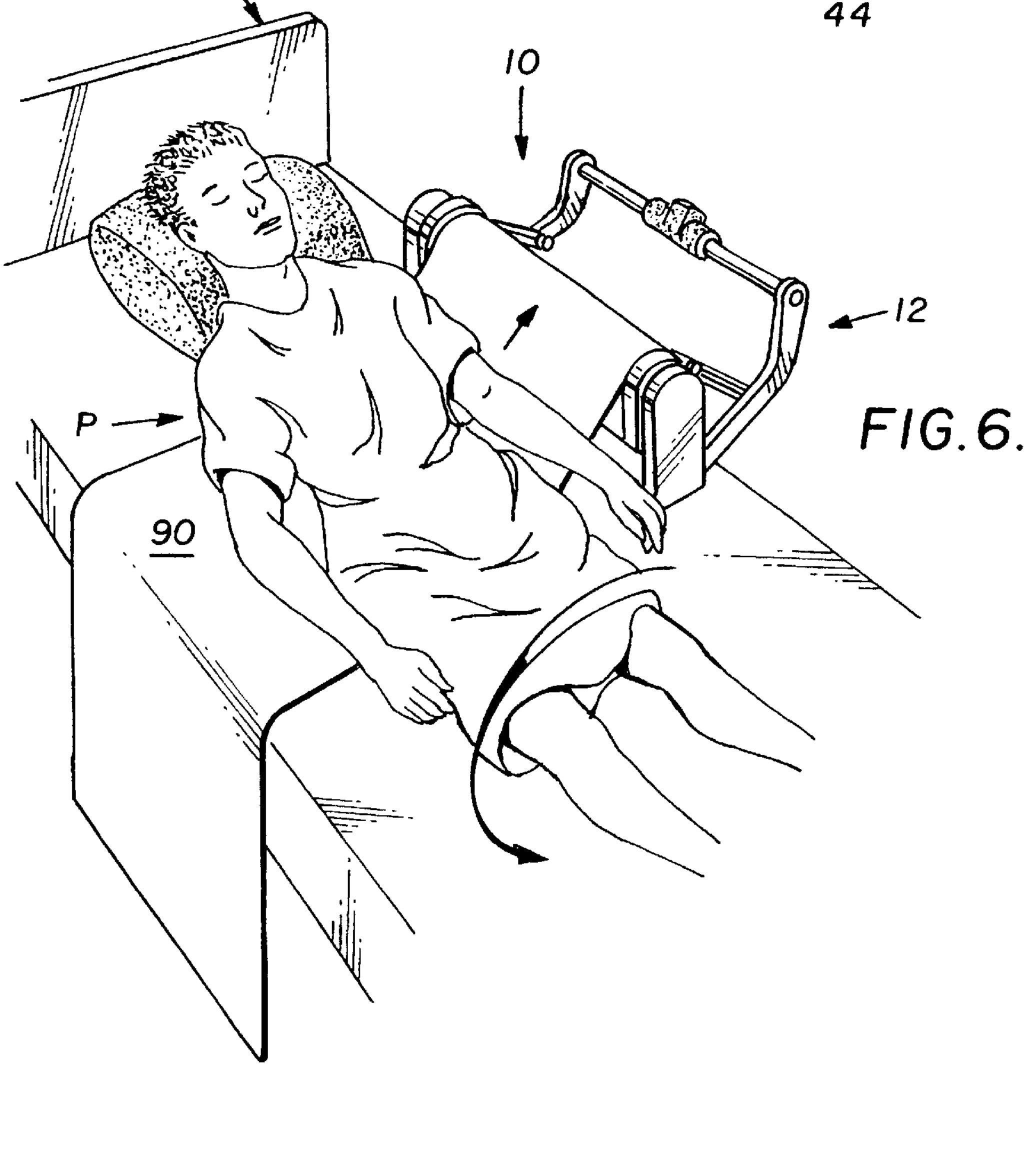
FIG. 6 is a partially broken away, perspective, view of the combined patient rotation device and rotation sheet of the present invention showing the patient just prior to being rotated from his back to his right side.
Figure 7:
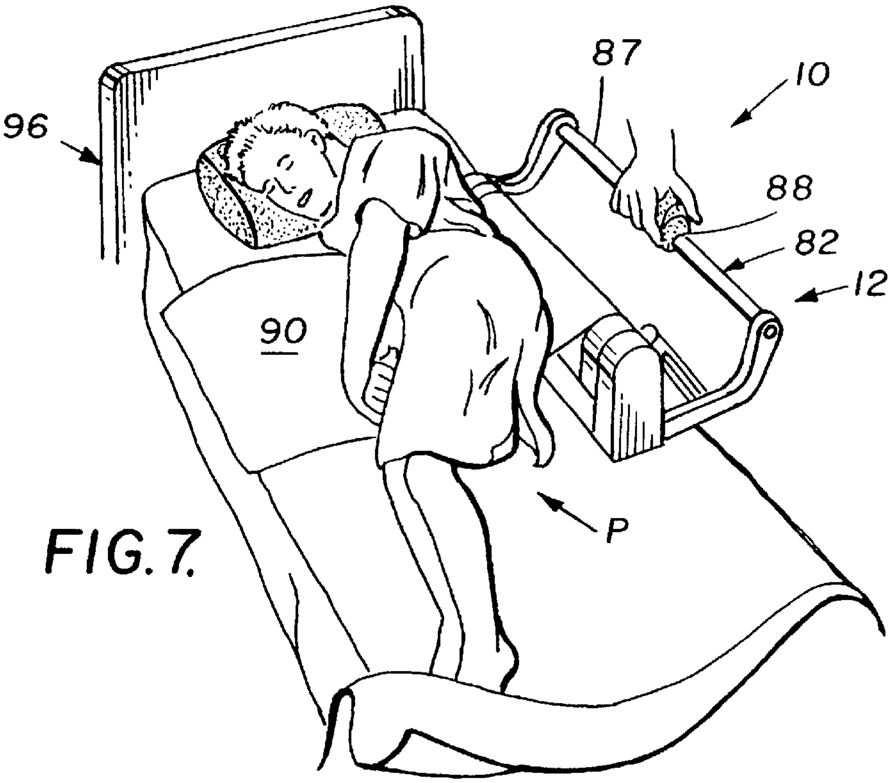
FIG. 7 is a partially broken away, perspective, view of the combined patient rotation device and rotation sheet of the present invention showing the patient just after being rotated from his back to his right side.

Referring now to FIGS. 6 and 7 of the drawings, reference numeral 10 designates the preferred embodiment of the patient rotation system of the present invention. As best shown in FIGS. 6 and 7, patient rotation system 10 comprises a patient rotation device 12 and a slip and grip rotation sheet 90 used in conjunction with a bed 96 and bedfast patient P.

Figure 1:
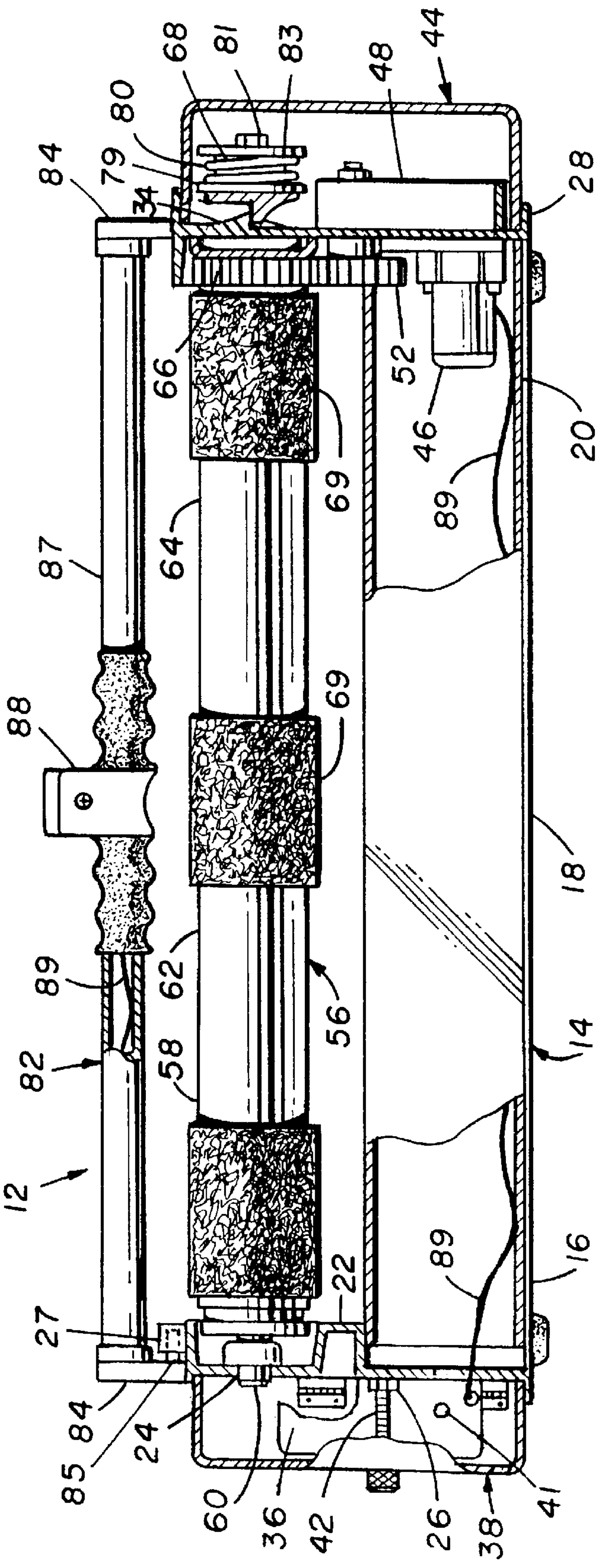
FIG. 1 is a partially broken away, front elevational, view of the patient rotation device used with the patient rotation system of the present invention with its handle in an upright condition for carrying the rotation device.
Figure 2:
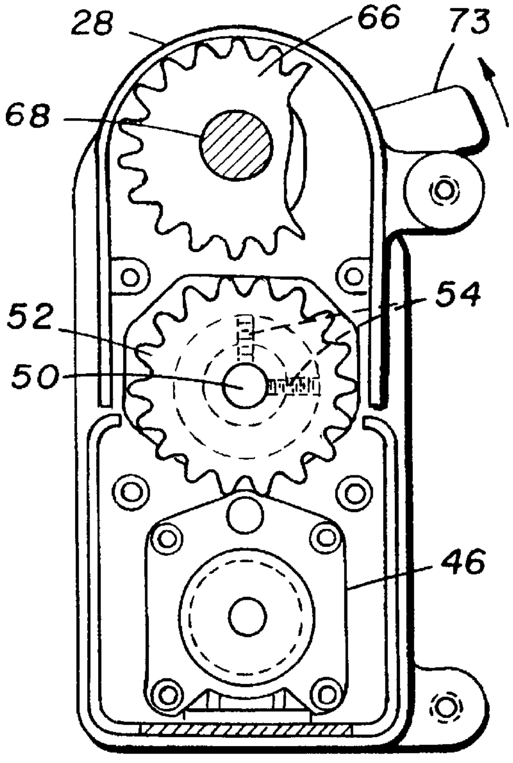
FIG. 2 is a partially broken away, side elevational, view, of the patient rotation device used in the patient rotation system of the present invention, with a side cover removed, and which shows the main gears in their operatively disengaged position.
Figure 3:
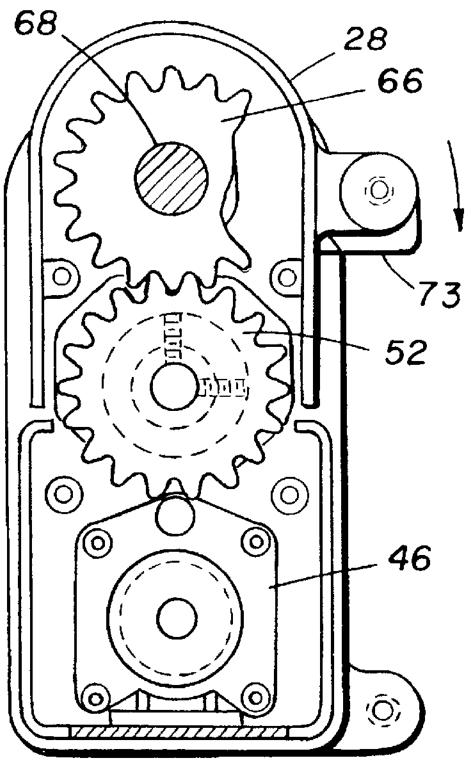
FIG. 3 is a partially broken away, side elevational, view of the patient rotation device used in the patient rotation system of the present invention, with a side cover removed, and which shows the main gears in their operatively engaged position.
Figure 4:
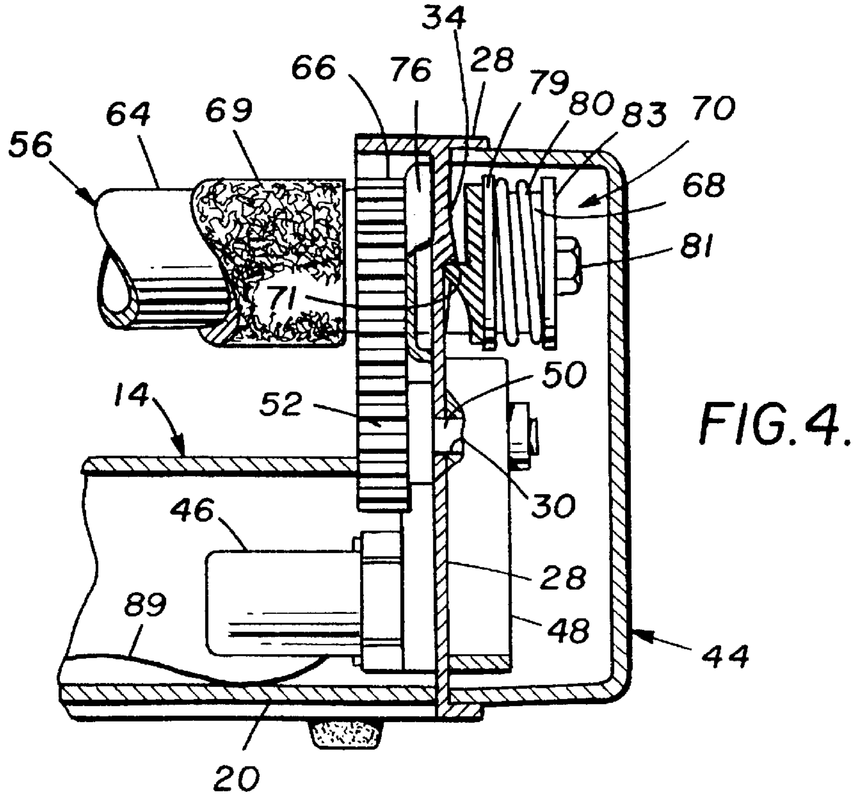
FIG. 4 is a partially broken away and in partial cross section, front elevational, view of a portion of the patient rotation device used in the patient rotation system of the present invention, with a front cover removed, and which shows the main gears in their operatively engaged position.
Figure 5:
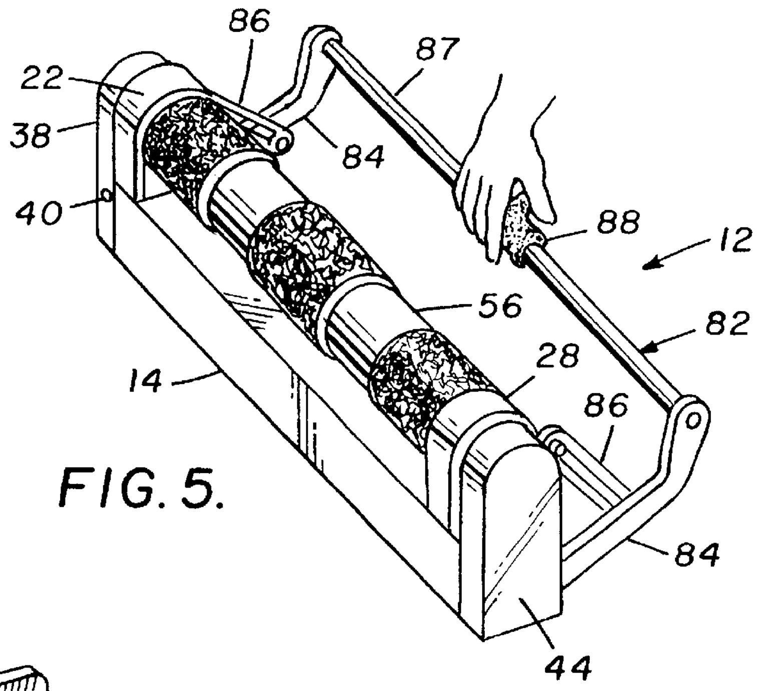
FIG. 5 is a perspective view of the patient rotation device used in the patient rotation system of the present invention with its handle in a downward operating position and showing the hand of an operator on a reversible on/off switch mounted on the handle.
Figure 9:
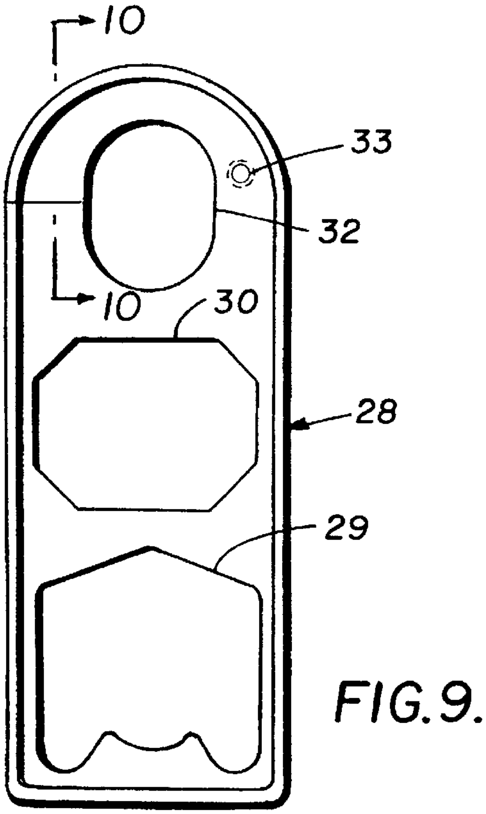
FIG. 9 is a side elevational view showing the details of one of the end plates of the patient rotation device of FIG. 1.
Figure 10:
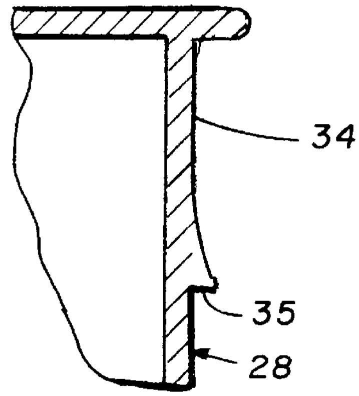
FIG. 10 is a partially broken away and in cross-section view along line 10—10 of FIG. 9 showing the cam surface and shoulder forming a part of the end plate depicted in FIG. 9.
Figure 11:
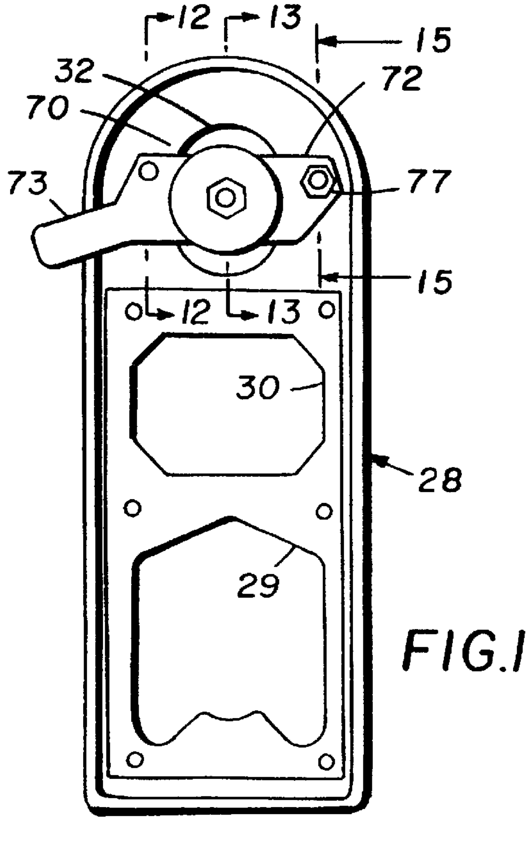
FIG. 11 is a side elevational view showing some of the details of one of the end plates and the clutch and bearing assembly of the patient rotation device of FIG. 1.
Figure 15:
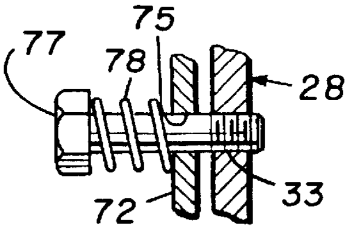
FIG. 15 is a partially broken away, and in partial cross section, view along line 15—15 of FIG. 11 showing some of details of the clutch and bearing assembly used in the patient rotation device of FIG. 1.
Figure 12:
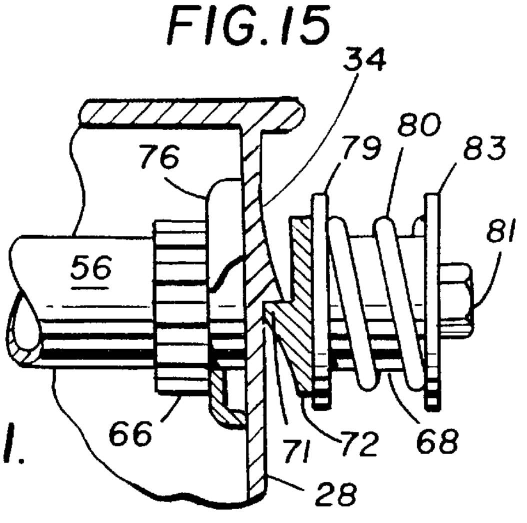
FIG. 12 is a partially broken away, and in partial cross-section, view along line 12—12 of FIG. 11 showing some of the details of one of the end plates, the roller, a gear, and the clutch and bearing assembly of the patient rotation device of FIG. 1.
Figure 13:
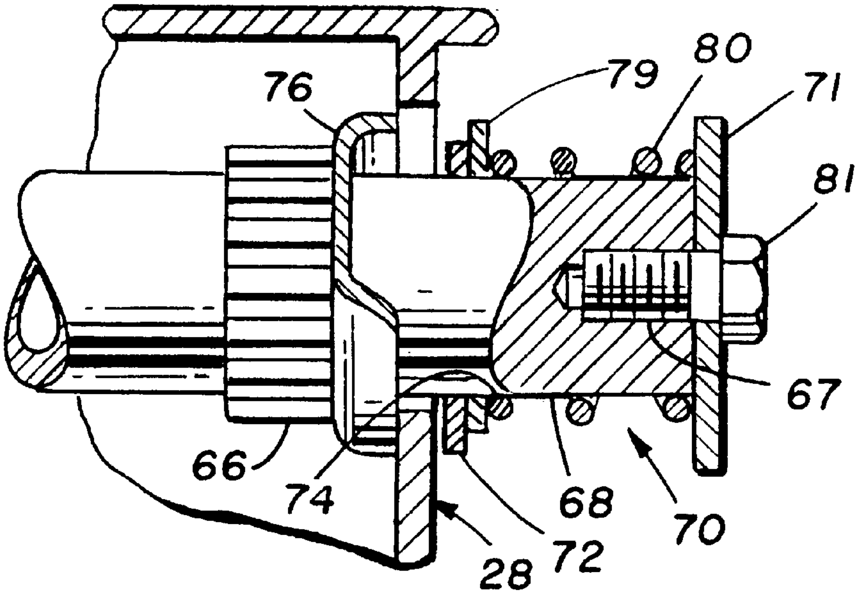
FIG. 13 is a partially broken away, and in partial cross-section view along line 13—13 of FIG. 11 showing some of the details of one of the end plates, the roller, a gear, and the clutch and bearing assembly of the patient rotation device of FIG. 1.

Referring now to FIGS. 1–4, patient rotation device 12 comprises an elongated frame having a longitudinal housing 14, a first end plate 22, a first end cover 38, a second end plate 28, a second end cover 44, a roller 56, a clutch and bearing assembly 70 (FIG. 4), and a handle 82. As best shown in FIG. 1, housing 14 has a first end portion 16, an intermediate portion 18 and a second end portion 20. As best shown in FIG. 1, first end plate 22 is secured to first end portion 16 of housing 14 and includes an opening 24 in its upper section (not numbered) and at least one threaded nut 26 secured thereto in its midsection (not numbered). As best shown in FIGS. 1, 9 and 11, second end plate 28 is secured to second end portion 20 of housing 14 and has a first opening 29 in its lower section, a second opening 30 in its midsection, a third opening 32 in its upper section, a threaded opening 33, and a sloped cam surface 34 (FIG. 10) adjacent third opening 32 which terminates at its bottom as a shoulder 35 (FIG. 10) at the lower end of cam surface 34. As best shown in FIG. 1, a rechargeable twelve volt battery pack 36 is secured to the outer surface (not numbered) of first end plate 22. A first end cover 38 is secured to first end plate 22 for covering the battery pack 36 by any conventional means such as threaded bolt 42 which engages threaded nut 26 secured to first end plate 22. An opening 40 (FIG. 5) is provided in first end cover 38 and an opening 41 (FIG. 1) is provided in battery pack 36 for insertion of a device (not shown) for facilitating the recharging of the twelve volt battery pack 36. Second end cover 44 includes a slot (not shown), the purpose for which will be explained hereinbelow, with second end cover 44 being secured to second end plate 28 by any conventional means such as a friction fit as shown in FIG. 1. As best shown in FIGS. 1 and 4, a twelve volt motor 46 and gearcase 48 is secured to second end plate 28 by any conventional means such as nuts and bolts with the motor 46 extending through the first opening 29 in second end plate 28 into the second end portion 20 of housing 14 and with its gearcase 48 being positioned on the outside of second end plate 28. As best shown in FIG. 4, gearcase 48 includes a shaft 50 which extends through second opening 30 of second end plate 28. As best shown in FIGS. 2–4, a gear 52 is secured to shaft 50 by one or more set screws 54. It has been found that a combination twelve volt motor and gearcase having Model (Spec.) No. 3858R1 which is available from Rex Engineering Corporation, Titusville, Fla. works very well as motor 46 and gearcase 48.

As best shown in FIG. 1, a cylindrical roller 56 including a first end section 58 with a shaft 60 extending therefrom, an intermediate section 62, and a second end section 64 having a gear 66 integral therewith and a shaft 68 extending therefrom. The shaft 60 of roller 56 extends through the opening 24 (FIG. 1) in first end plate 22 to rotatably mount the roller 56 in first end plate 22. As best shown in FIGS. 1, 4, 11–13 and 15, the clutch and bearing assembly 70 comprises a clutch plate 72 having a handle 73 (FIGS. 2, 3 and 11) which extends through an opening (not shown) in second end cover 44, a first central opening 74 (FIG. 13) which surrounds shaft 68 on the second end section 64 of roller 56, a second opening 75 (FIG. 15), and a locking projection 71 extending from its inner surface (not numbered); an externally threaded bolt 77 (FIGS. 11 and 15) having a compression spring 78 mounted thereon and extending through second opening 75 in clutch plate 72 for tapping into a threaded opening 33 (FIG. 15) in second end plate 28; a bearing cup 76 (FIGS. 4 and 12); a first washer 79 (FIG. 12) mounted upon shaft 68 of roller 56, a compression spring 80 mounted upon shaft 68, a second washer 83 mounted upon shaft 68, and an externally threaded bolt 81 for tapping into a threaded opening 67 (FIG. 15) in the end of shaft 68. Bearing cup 76 fits adjacent to and partially surrounds the third opening 32 (FIGS. 10 and 11) of second end plate 28 and includes a round opening (not shown) in its bottom for rotatably receiving the shaft 68 extending from gear 66 integral with roller 56. Roller 56 further includes three pieces of VELCRO 69 respectively secured by any conventional means to the first end section 58, the intermediate section 60, and the second end section 62 of roller 56 for purposes to be later explained. As best shown in FIGS. 1 and 5–7, handle 82 is pivotally secured to first and second end plates 22 and 28 and comprises a pair of end members 84, a pair of slide straps 86 and a cross element 87 connecting the free ends of end members 84. A two way reversible switch 88 (FIGS. 1 and 5–7) is mounted on the cross element 87 of handle 82. A releasable latch 27 (FIG. 1) is pivotally secured to first end plate 22 for engaging a pin 85 (FIG. 1) extending from one of the end members 84 of handle 82 to lock handle 82 in its upright carrying position. As best shown in FIG. 1, a wiring harness 89 connect twelve volt battery pack 36, reversible switch 88 and twelve volt motor 46.

Figure 8:
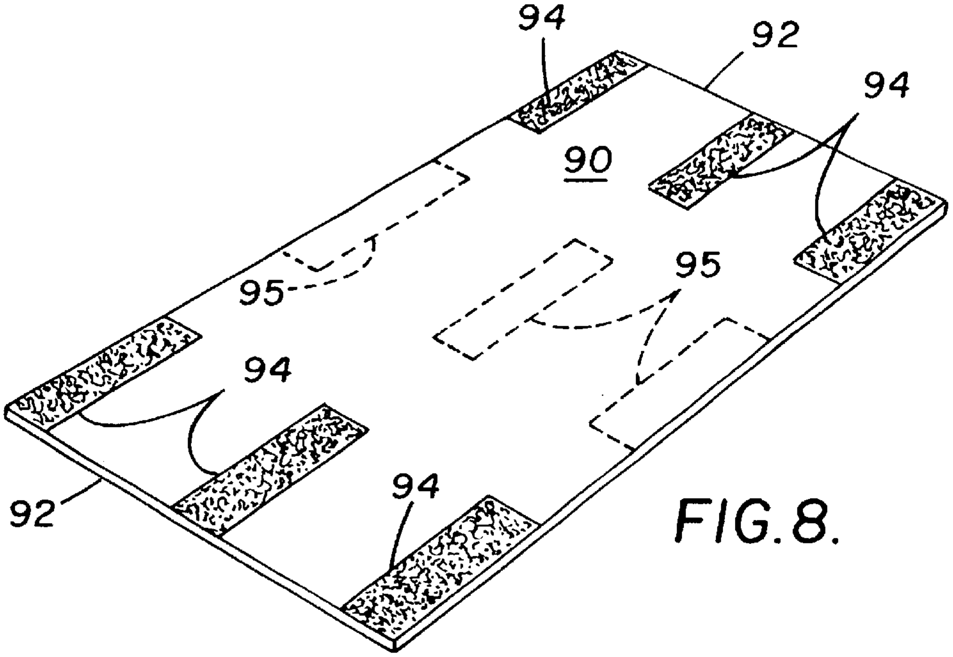
FIG. 8 is a perspective, bottom, view of the rotation sheet forming a part of the present invention in combination with the patient rotation device.

As best shown in FIG. 8, the slip and grip rotation sheet 90 measures approximately six feet by two and one-half feet and includes a pair of end edges 92, each of which includes three strips of VELCRO material 94 attached adjacent to each end edge 92 on the slip (lower) side of the sheet 90 for purposes to be later explained, and a plurality of strips 95 of rubberized material secured to its upper grip side for purposes to be later explained. It has been found that a nylon denier material identified as 59/60, Antron/Twill, available from Top Value Fabrics, Inc., 401 West Carmel Drive, P.O. Box 1250, Carmel, Ind. 46032 is suitable for use in making the rotation sheet 90. It has been further found that rubberized material having Catalog #43278 and sold under trademark SLIP-STOP by Camco Manufacturing, Inc., Greensboro, N.C. 27409 is suitable for use in making the rubberized strips 95. The rubberized strips 95 on the grip side of rotation sheet 90 permit a firmer grip on the linen saver and/or folded sheet upon which the patient P is laying upon to allow comfort and the easy turning of patient P. For operational purposes it is not critical that a linen saver, folded sheet or the rubberized strips 95 be incorporated in the rotation system of the present invention, but it has been found that such use add to the comfort of patient P.

Figure 14:
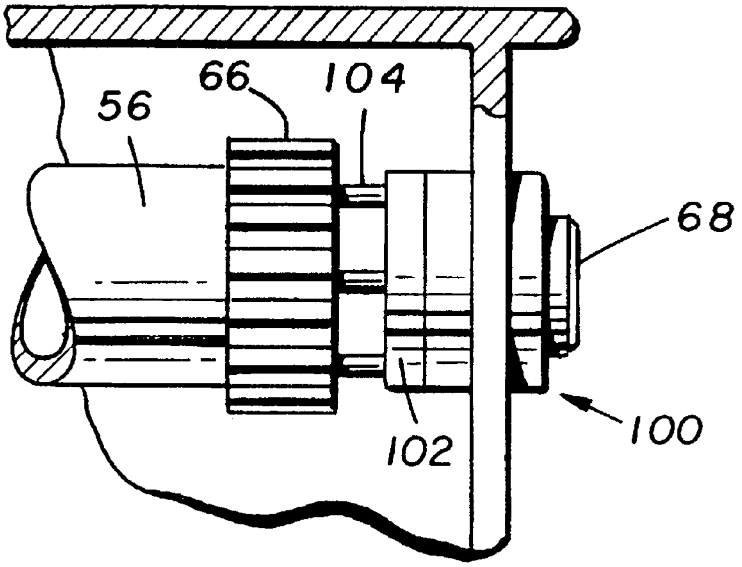
FIG. 14 is a partially broken away, and in partial cross-section, view of a portion of a second embodiment of the patient rotation device depicting an electric clutch used in a second embodiment of the patient rotation device of the present invention.

FIG. 14 depicts an embodiment of patient rotation device 12 which utilizes an electric spring clutch 100 in lieu of the clutch and bearing assembly 70–81 used in the first embodiment of rotation device 12 as depicted in FIGS. 1–13 and 15. Electric spring clutch 100 is fixedly secured to shaft 68 on the end of roller 56 and includes a three dog hub 102, three prongs 104 which fits in three dog hub 102, and a spring (not shown) fixed on three dog hub 102. It has been found that the high performance electric spring clutch, Model No. EC 75 manufactured and sold by Reele Precision Manufacturing Corporation, 1259 Wolters Blvd., St. Paul, Minn., works very well in this embodiment of the invention.

The patient rotation system 10 of the present invention can be easily operated by one attendant, even by an attendant weighing no more than one hundred pounds, with little, if any strain on either the patient P or the attendant. The operation will now be explained by use of the patient rotation device 12 and rotation sheet 90 as depicted in FIGS. 1–13 and 15. With a slip and grip rotation sheet 90 already positioned under patient P lying on his back (FIG. 6) with a linen saver (not shown) and conventional sheet (not shown) in a folded condition between the patient P and the rotation sheet 90 with its end edges 92 extending off of the side edges of bed 96 as shown in FIG. 6, and with the VELCRO strips 94 facing down and away from patient P and with rubberized strips 95 facing patient P, the patient rotation system 10 is used and operated in the following steps.

1. The attendant brings the patient rotation device 12 to a bed 96, lifts one end edge 92 of rotation sheet 90, and places the rotation device 12 between the patient P and one side edge of the bed 96.
2. The attendant next releases latch 27 from pin 85 to lower the handle 82 to its downward, operating, position, then secures VELCRO strips 94 of rotation sheet 90 to respective VELCRO strips 69 on roller 56, then grasps handle 73 of clutch plate 72 and moves clutch plate 72 away from second end plate 28, by compressing springs 78 and 80, to allow the movement of clutch plate 72 along cam surface 34 of second end plate 28 until locking projection 71 of clutch plate 72 engages shoulder 35 on second end plate 28 which locks gear 66 in engagement with gear 52, and then presses switch 88 such that a small portion of rotation sheet 90 is wrapped upon roller 56 to take up the slack in rotation sheet 90 to the condition as generally depicted in FIG. 6.
3. The attendant next actuates the switch 88 which actuates motor 46 to cause rotation sheet 90 to be pulled and wrapped onto roller 56, which action rotates patient P ninety degrees from his back (as shown in FIG. 6) to his right side (as shown in FIG. 7).
4. The attendant will then grasp handle 74 of clutch plate 72 to disengage locking projection 71 of clutch plate 72 from shoulder 35 on second end plate 28 which permits the disengagement of gear 66 from gear 52 which causes the roller 56 to rotate freely in a counterclockwise direction as shown in FIG. 6 to release the VELCRO strips 94 on rotation sheet 90 from the VELCRO strips 69 on roller 56.
5. The attendant then raises handle 82 to its upright position as shown in FIG. 1 so that latch 27 locks handle 82 in its raised upright position. The attendant then removes the rotation device 12 from the bed 96 and straighten rotation sheet 90 so that it generally hugs the mattress of the bed 96. At this time, there is still sufficient rotation sheet 90 on the bed 96 such that the patient P could in two hours be rotated another ninety degrees from either side of the bed 96.
6. After the patient is turned ninety degrees as explained in subparagraphs 1–5 hereinabove, the attendant can then carry patient rotation device to another patient on another bed and follow the same general procedures to rotate a new patient ninety degrees.

The patient rotation system 10 utilizing the electric clutch 100 as incorporated in the embodiment of the invention as depicted in FIG. 14 is operated in substantially the same manner as the patient rotation system 10 depicted in FIGS. 1–13 and 15.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense. For example, battery pack 36 with its opening 41 could be secured within end portion 16 of housing 14 by any conventional means such as nuts and bolts in lieu of being secured to the outer surface of first end plate 22, and; if so, end portion 16 of housing 14 would include an opening such as opening 40 in alignment with opening 41 for facilitating the recharging of battery pack 36. Furthermore, motor 46 and gearcase 48 could be surrounded, in whole or in part, with a rubber-like material such as foam to isolate the motor 46 and gearcase 48 from end portion 20 of housing 14 and second end plate 28 to eliminate or greatly diminish possible noise due to vibration which might have a tendency to awaken a bedfast patient while undergoing the rotation process particularly during the nighttime. Still furthermore, an appropriate insulation material could be placed within housing 14 and second end cover 44 to eliminate or greatly diminish noise which might have a tendency to awaken a bedfast patient while undergoing the rotation process particularly during the nighttime. Furthermore still, a lever for engaging either an end member 84 or cross element 87 of handle 82 could be mounted on first end plate 22 to hold handle 82 in its upright carrying position.

I claim:

1. A system for rotating a bedfast patient lying in a bed from his back to either of his sides or from either of his sides to his back, the system comprising:

a rectangular draw sheet having a slick first side, a coarsed second side a pair of first parallel, opposed, edges, a pair of second parallel, opposed, edges, and securing means on said first pair of parallel, opposed, sides;

a patient rotating apparatus including a longitudinal housing having first and second end portions, a first end plate, said first end plate being secured to said first end portion of said longitudinal housing, a second end plate having a plurality of openings therein and being secured to said second end portion of said longitudinal housing, a battery, an electrical motor, a gearcase having a shaft extending therefrom through one of said openings in said second end plate, a first gear secured to said shaft extending from said gearcase, a cylindrical roller having a first end section, an intermediate section and a second end section, a handle pivotally secured to said first and second end plates, a switch mounted on said handle and being in a circuit which includes said battery and said electrical motor, said second end section of said roller having a second gear and shaft secured thereto, means for rotatably mounting said roller between said first and second end plates, and means associated with said second gear for allowing said second gear to be driven in a first direction by said first gear and to rotate freely in a second direction;

said securing means on one of said parallel, opposed, edges of said draw sheet being adapted to being engaged with said securing means on said roller.

2. A system as in claim 1 wherein said means associated with said second gear for allowing said second gear to be driven in a first direction by said first gear and to rotate freely in a second direction includes a clutch assembly.

3. A system as in claim 2 wherein said clutch assembly is electrical.

4. A system as in claim 2 wherein said second end section of said roller includes a shaft extending therefrom and wherein said clutch assembly is defined as a clutch plate and bearing cup, each having a central opening for receiving said shaft extending from said roller, said clutch plate having an arm extending therefrom and being pivotally mounted to said second end plate whereby responsive to pivotal movement of said clutch plate by said arm, said shaft extending from said roller is displaced to, thus, displace said second gear from meshed relation with said first gear.

5. A system for rotating a bedfast patient lying in a bed from his back to either of his sides or from either of his sides to his back, the system comprising:

a rectangular draw sheet having a slick first side, a coarsed second side, a pair of first parallel, opposed, edges, a pair of second parallel, opposed, edges, and securing means on said first pair of parallel, opposed, sides;

a patient rotating apparatus including a longitudinal housing having first and second end portions, a first end plate, said first end plate being secured to said first end portion of said longitudinal housing, a second end plate having a plurality of openings therein and being secured to said second end portion of said longitudinal housing, a battery, an electrical motor, a gearcase having a shaft extending therefrom through one of said openings in said second end plate, a first gear secured to said shaft extending from said gearcase, a cylindrical roller having a first end section, an intermediate section and a second end section, a handle pivotally secured to said first and second end plates, a switch mounted on said handle and being in a circuit which includes said battery and said electrical motor, said second end section of said roller having a second gear and shaft secured thereto, and means for rotatably mounting said roller between said first and second end plates, and for selectively engaging and disengaging said gear on said second end section of said roller and said gear secured to said shaft extending from said gearcase, and securing means on said roller;

said securing means on one of said parallel, opposed, edges of said draw sheet being adapted to being engaged with said securing means on said roller.

6. A system as in claim 5 wherein said means for rotatably mounting said roller and for selectively engaging and disengaging said gear on said second end section of said roller and said gear secured to said shaft extending from said gearcase includes a clutch assembly which allows said gear on said second end section of said roller to be driven in a first direction and to rotate freely in a second direction.

7. A system as in claim 6 wherein said clutch assembly is electrical.

8. A system as in claim 6 wherein said clutch assembly is defined as a clutch plate and bearing cup, each having a central opening for receiving said shaft secured to said second end section of said roller, said clutch plate having an arm extending therefrom and being pivotally mounted to said second end plate whereby responsive to pivotal movement of said clutch plate by said arm, said shaft secured to said second end section of said roller is displaced to, thus, displace said second gear from meshed relation with said first gear.

9. A system as in claim 6 wherein at least one strip of rubberized material is secured to said coarsed second side of said draw sheet.

10. A system as in claim 9 wherein said securing means on said first pair of opposed sides of said draw sheet and said securing means on said roller comprise VELCRO strips.

11. A system for repositioning a bedfast patient lying in a bed from his back to either of his sides or from either of his sides to his back on a periodic basis, the system comprising:

a rectangular draw sheet having a pair of first, opposed, edges, a pair of second opposed, edges, and securing means on each edge of said first pair of opposed edges;

a compact, light weight, portable patient repositioning apparatus adapted to be handcarried from bed to bed, said apparatus including a longitudinal housing having first and second end portions, a first end plate secured to said first end portion, a second end plate secured to said second end portion, a cylindrical roller having a first end section, an intermediate section and a second end section, means for rotatably mounting said roller between said first and second end plates, electrical drive means for turning said cylindrical roller, a handle pivotally secured to said frist and second end portions, and swich means mouned on said handle and in a circuit which includes said electrical drive means, said patient repositioning apparatus being adapted for selective placement upon the bed between the bedfast patient and either side edge of the bed; and means on said roller of said patient repositioning apparatus for detachable engagement with said securing means on a selected edge of said pair of edges of said draw sheet for pulling on said draw sheet to reposition the patient upon the bed from his back to either of his sides or from either of his sides to his back upon activation of said switch means and said electrical drive means.

12. A system as in claim 11 wherein said electrical drive means includes a source of motive power, a first gear connected to said source of motive power for rotation thereby, a second gear connected to said first end section of said roller, and clutch means associated with said second gear to be driven in a first direction by said first gear and to rotate freely in a second direction.

13. A system as in claim 12 wherein said clutch means is an electrical clutch.

14. A system for rotating a bedfast patient lying in a bed from either of his sides to his back or from his back to either of his sides or from either of his sides to the other of his sides, the system comprising:

a substantially rectangular sheet having a first and second pair of parallel, opposed, edges and sheet securing means on said first pair of parallel, opposed, edges;

a compact apparatus including a frame assembly, a roller including first and second ends, means for supporting said roller in said frame assembly, and means for rotating said roller; and means for connecting said roller of said apparatus to said sheet securing means on said first pair of opposed edges of said rectangular sheet for pulling on said sheet to rotate the patient lying in the bed from either his back to one of his sides or from his back to either of his sides, or from one of his sides to the other of his sides;

said means for rotating said roller comprises a source of motive power, a first gear connected to said source of motive power for rotation thereby, a second gear mounted on said first end of said roller, said second gear disposed for displacement into and out of meshed relation with said first gear, and clutch means for moving said second gear into and out of meshed relation with said first gear.

15. A system as in claim 14 wherein said second gear is provided with a shaft extending from said first end thereof.

16. A system as in claim 15 wherein said clutch means is defined as a clutch plate and a bearing cup, each having a central opening to receive said shaft therein, said clutch plate having an arm extending therefrom and being pivotally mounted to said frame assembly whereby responsive to pivotal movement of said clutch plate by said arm, said shaft is displaced to, thus, displace said second gear from meshed relation with said first gear.

* * * * *